(12) United States Patent
Li et al.

(10) Patent No.: US 8,579,455 B2
(45) Date of Patent: Nov. 12, 2013

(54) DIRECT TYPE BACKLIGHT MODULE AND LIQUID CRYSTAL DISPLAY DEVICE

(75) Inventors: Quan Li, Shenzhen (CN); Shihhsiang Chen, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 51 days.

(21) Appl. No.: 13/380,874

(22) PCT Filed: Dec. 7, 2011

(86) PCT No.: PCT/CN2011/083617
§ 371 (c)(1),
(2), (4) Date: Dec. 26, 2011

(87) PCT Pub. No.: WO2013/078723
PCT Pub. Date: Jun. 6, 2013

(65) Prior Publication Data
US 2013/0141896 A1    Jun. 6, 2013

(30) Foreign Application Priority Data

Dec. 2, 2011  (CN) .................. 2011 1 03961793

(51) Int. Cl.
G02F 1/13357   (2006.01)
(52) U.S. Cl.
USPC .................. 362/97.3; 362/97.2; 362/97.1
(58) Field of Classification Search
USPC ........................ 362/97.1, 97.2, 97.3
See application file for complete search history.

(56) References Cited

U.S. PATENT DOCUMENTS

| | | | | |
|---|---|---|---|---|
| 2007/0047261 | A1* | 3/2007 | Thompson et al. | 362/623 |
| 2013/0128186 | A1* | 5/2013 | Kuo et al. | 362/97.2 |
| 2013/0141894 | A1* | 6/2013 | Yu et al. | 362/97.2 |
| 2013/0155652 | A1* | 6/2013 | Zhang | 362/97.1 |

FOREIGN PATENT DOCUMENTS

| | | |
|---|---|---|
| CN | 1584706 A | 2/2005 |
| CN | 1651987 A | 8/2005 |
| CN | 1725082 A | 1/2006 |
| CN | 101118345 A | 2/2008 |
| CN | 101329471 A | 12/2008 |
| CN | 201680304 U | 12/2010 |
| JP | 2006032273 A | 2/2006 |
| JP | 2008027885 A | 2/2008 |
| WO | WO2011010487 A1 | 1/2011 |

OTHER PUBLICATIONS

Yang Yan, The International Searching Authority written comments, Aug. 2012, CN.
Li Yan, The first office action, Feb. 2013, CN.

* cited by examiner

*Primary Examiner* — David V Bruce
(74) *Attorney, Agent, or Firm* — IPro, Inc.; Na Xu

(57) ABSTRACT

The present invention discloses a direct type backlight module and a Liquid Crystal Display (LCD) device. A direct type backlight module comprises a diffuser plate located on the light emergent surface and a backplane opposite to the diffuser plate; a support pin is arranged between the backplane and the diffuser plate, and the support pin is rigidly fixed to the backplane. Because the support pin of the present invention is rigidly fixed on the backplane, there is no direct relationship between the present invention and the thicknesses of the backplane and the LED light plate fixed on the backplane, and no noise is produced by the loosed "mushroom head" due to infirm gripping; therefore, the support pin can be firmly fixed. The support pin can be rigidly fixed by modes facilitating the automatic operation like SMT welding and riveting, which is advantageous for promoting the productivity and the conformance rate.

20 Claims, 2 Drawing Sheets

DIRECT TYPE BACKLIGHT MODULE AND LIQUID CRYSTAL DISPLAY DEVICE

TECHNICAL FIELD

The present invention relates to the field of liquid crystal displays, and more particularly to a direct type backlight module and a Liquid Crystal Display (LCD) device.

BACKGROUND

With the appeal of energy saving, environmental protection, etc., the share of liquid crystal televisions using an LED as the back light source in the whole market of the panel television is rapidly increased year by year. At present, the common LED back light type mainly includes the edge type and the direct type. In the direct type back light, because the diffuser plate will be used, the support pin for supporting the diffuser plate is needed.

FIG. 1 shows an existing mode for clamping of the support pin and the backplane by a hook. However, because the support pin simultaneously grips the backplane and the LED PCB, in consideration of the condition that the LED light source dissipates heat, the thicknesses of the backplane and the LED PCB are large and the size is large, which influence the elasticity of the "mushroom head" of the support pin, thereby resulting in effects like loose grip, loose support pin, noise, or scored diffuser plate.

SUMMARY

One aim of the present invention is to provide a direct type backlight module for firmly fixing the support pin and an LCD device.

The aim of the present invention is achieved by the following technical schemes:

A direct type backlight module comprises a diffuser plate located on the light emergent surface and a backplane opposite to the diffuser plate; a support pin is arranged between the backplane and the diffuser plate, and the support pin is rigidly fixed to the backplane.

Preferably, the support pin is formed by connecting the base and the head; the base is fixed on the bottom of the backlight module, and the head contacts the diffuser plate. The base can be designed as a general part, and then a proper head is arranged in accordance with different requirements of the height and the intensity to improve the generality of the support pin.

Preferably, the base is a metal base, and the head is a plastic head. The metal base is easy to be fixed on the LED light plate by modes like welding and riveting; the plastic cement has a certain flexibility which avoids the problem that the rigid material directly contacts the diffuser plate and is easy to be scored and torn.

Preferably, the fixing mode of interference fit is used between the head and the base. This is one fitting mode between the head and the base.

Preferably, the base is inserted into the head. This is another fitting mode between the head and the base.

Preferably, the head is of white plastic, and the surface of the base is applied with the white coating. Because the white object can reflect light of all colors, the unified white can reduce the absorption loss of the light and increase the light incident rate.

Preferably, the LED light plate is fixed on the backplane of the direct type backlight module, and the support pin is rigidly fixed on the LED light plate through the LED light plate and the backplane. The support pin is fixed on the LED light plate, and is installed and removed together with the LED light plate, which facilitates the assembling and disassembling.

Preferably, the support pin is fixed on the LED light plate by welding. This is one specific fixing mode of the support pin.

Preferably, the support pin is fixed on the LED light plate by riveting. This is another specific fixing mode of the support pin.

Preferably, the LED light plate is fixed on the backplane of the direct type backlight module, wherein, the support pin is rigidly fixed on the backplane, and the LED light plate is correspondingly provided with through holes on the fixing place of the support pin. The intensity of the backplane is high, so that the support pin is more firmly fixed on the backplane.

Preferably, the support pin is fixed on the LED light plate by welding or riveting. This is a specific fixing mode of the support pin.

Preferably, the LED light plate is fixed on the backplane of the direct type backlight module; screws are arranged on the bottom of the support pin; the LED light plate is fixed on the backplane of the direct type backlight module, and the screws simultaneously go through the backplane and the LED light plate, and are locked on the backplane and the LED light plate by nuts. The technical scheme grips the backplane and the LED light plate by the fitting of the screws and the nuts, which achieves the fixing among the support pin, the LED light plate and the backplane, thereby simplifying the assembling steps, increasing the production efficiency, and reducing the cost.

An LCD device comprises the backlight module.

Because the support pin of the present invention is rigidly fixed on the backplane, there is no direct relationship between the present invention and the thicknesses of the backplane and the LED light plate fixed on the backplane, and no noise is produced by the loosed "mushroom head" due to infirm gripping; therefore, the support pin can be firmly fixed. The support pin can be rigidly fixed by modes facilitating the automatic operation like SMT welding and riveting, which is advantageous for promoting the productivity and the conformance rate.

Wherein: 1. Support pin; 11. Head; 12. Base; 2. Diffuser plate; 3. LED light plate; 4. Backplane.

DETAILED DESCRIPTION

The present invention will be further described in accordance with the figures and the preferred embodiments.

An LCD device comprises a backlight module; the backlight module comprises a diffuser plate 2 located on the light emergent surface and a backplane 4 opposite to the diffuser plate 2, and an LED light plate 3 is fixed on the backplane 4. A support pin 1 is arranged between the backplane 4 and the diffuser plate 2, and the support pin 1 is rigidly fixed to the backplane 4 to support the diffuser plate 2. The invention will further be described in detail in accordance with the specific embodiments.

Embodiment 1

Figure 1:
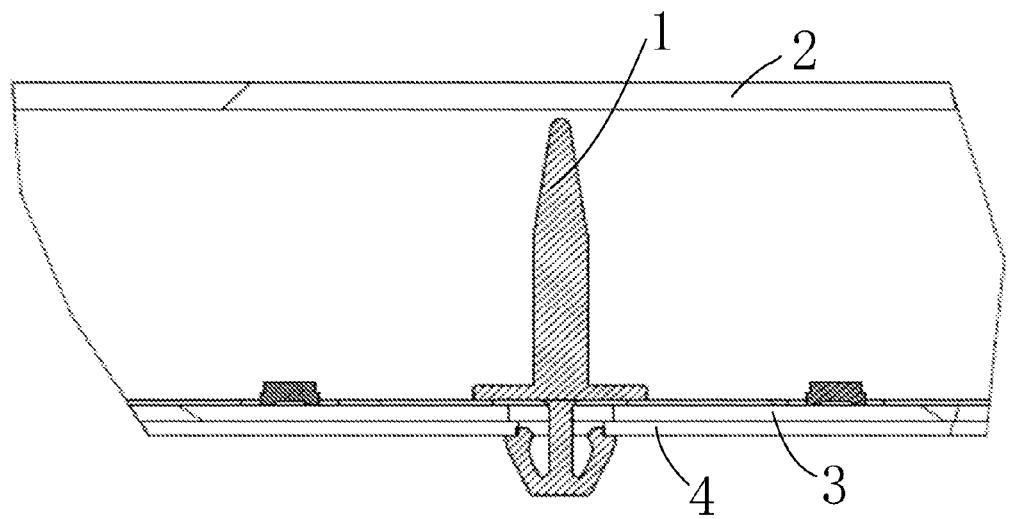
FIG. 1 is a schematic diagram of a fixing mode of an existing support pin.
Figure 2:
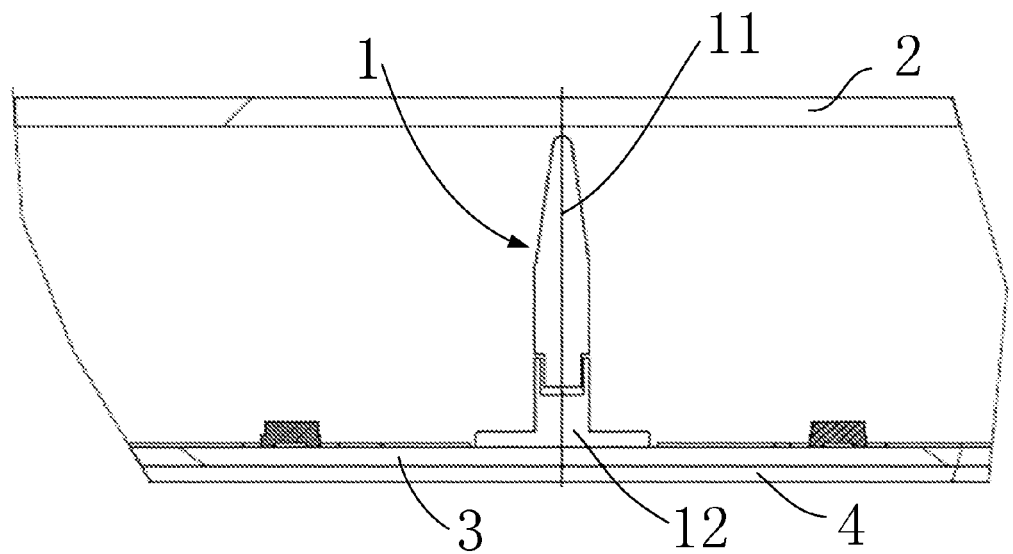
FIG. 2 is a schematic diagram of welding of a support pin of the first example of the present invention.
Figure 3:
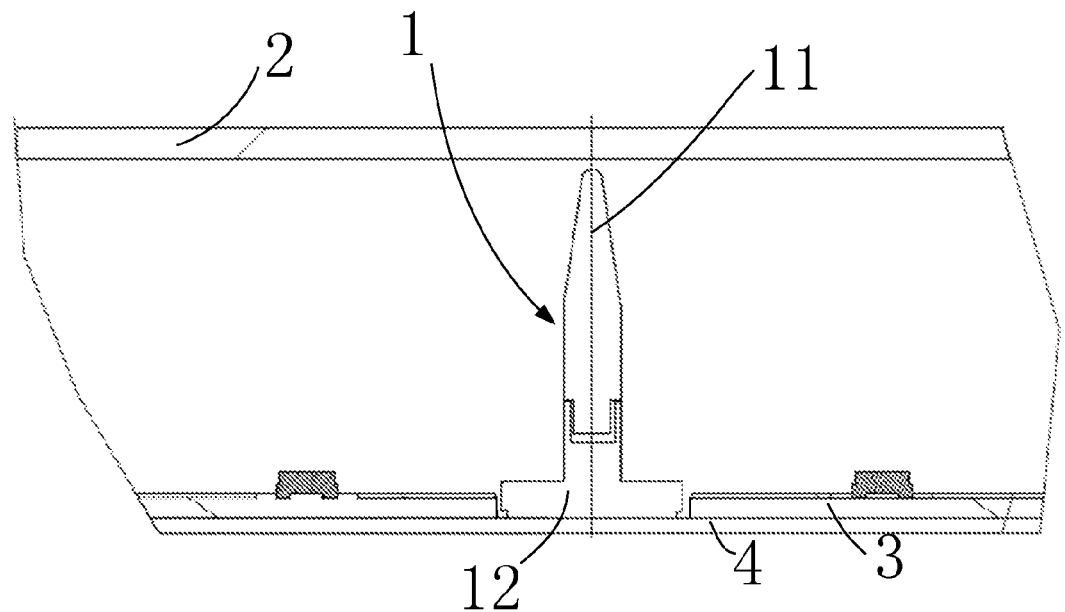
FIG. 3 is a schematic diagram of riveting of a support pin of a first embodiment of the present invention.

As shown in FIG. 2 and FIG. 3, the support pin 1 is fixed on the LED light plate 3 by SMT welding and riveting. The support pin 1 is fixed on the LED light plate 3, and is installed and removed together with the LED light plate, which facilitates the assembling and disassembling.

The support pin 1 is formed by connecting the base 12 and the head 11; the base 12 is fixed on the bottom of the backlight module, and the head 11 contacts the diffuser plate 2. The base 12 can be designed as a general part, and then a proper head 11 is arranged in accordance with different requirements of height and intensity to improve the generality of the support pin 1. The fixing mode of interference fit is used between the head 11 and the base 12, and the fixing mode of inserting the base 12 into the head 11 is also acceptable. The head 11 is of white plastic, and the surface of the base 12 is applied with the white coating to promote the appearance of the whole entity.

Embodiment 2

Figure 4:
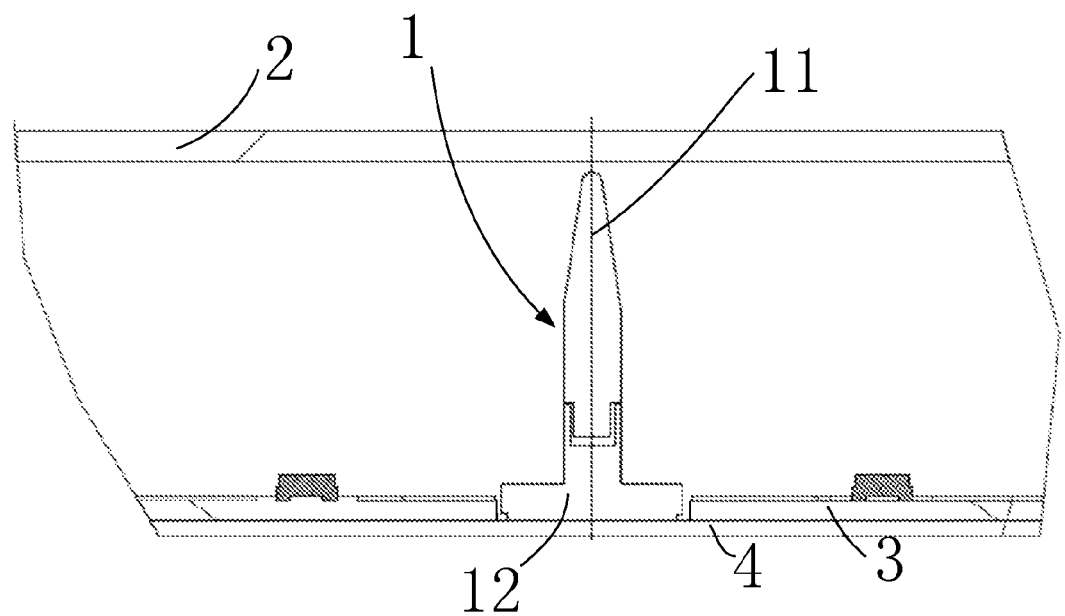
FIG. 4 is a schematic diagram of welding of a support pin of a second embodiment of the present invention.

As shown in FIG. 4, the support pin 1 is rigidly fixed on the backplane 4 by SMT welding and riveting; the LED light plate 3 is correspondingly provided with through holes on the fixing place of the support pin 1; the through holes can avoid the support pin 1, and the support pin 1 goes through he through holes and is fixed on the backplane 4. The intensity of the backplane 4 is high, so that the support pin 1 is more firmly fixed on the backplane 4.

The support pin 1 is formed by the connecting of the base 12 and the head 11; the base 12 is fixed on the bottom of the backlight module, and the head 11 contacts the diffuser plate 2. The base 12 can be designed as a general part, an then a proper head 11 is arranged in accordance with different requirements of height and intensity to improve the generality of the support pin 1. The fixing mode of interference fit is used between the head 11 and the base 12, and the fixing mode of inserting the base 12 into the head 11 is also acceptable. The head 11 is of white plastic, and the surface of the base 12 is applied with the white coating to promote the appearance of the whole entity.

Embodiment 3

The screws are arranged on the bottom of the support pin 1; the screws simultaneously go through the backplane 4 and the LED light plate 3 and is locked on the backplane 4 and the LED light plate 3 by nuts; the backplane 4 and the LED light plate 3 are gripped by the fitting of the screws and the nuts, which achieves the fixing among the support pin 1, the LED light plate 3 and the backplane 4, thereby simplifying the assembling steps, increasing the production efficiency, and reducing the cost.

The support pin 1 is formed by the connecting of the base 12 and the head 11; the base 12 is fixed on the bottom of the backlight module, and the head 11 contacts the diffuser plate 2. The base 12 can be designed as the general part, an then a proper head 11 is arranged in accordance with different requirements of height and intensity to improve the generality of the support pin 1. The fixing mode of interference fit is used between the head 11 and the base 12, and the fixing mode of inserting the base 12 into the head 11 is also acceptable. The head 11 is of white plastic, and the surface of the base 12 is applied with the white coating to promote the appearance of the whole entity.

The present invention is described in detail in accordance with the above contents with the specific preferred embodiments. However, this invention is not limited to the specific embodiments. For the ordinary technical personnel of the technical field of the present invention, on the premise of keeping the conception of the present invention, the technical personnel can also make simple deductions or replacements, and all of which should be considered to belong to the protection scope of the present invention.

The invention claimed is:

1. A direct type backlight module, comprising: a diffuser plate located on the light emergent surface and a backplane opposite to the diffuser plate; a support pin is arranged between the backplane and the diffuser plate, the support pin is rigidly fixed to the backplane, and the support pin is formed by connecting a base and a head respectively formed.

2. The direct type backlight module of claim 1, wherein the base is fixed on the backplane of the direct type backlight module, and the head contacts the diffuser plate.

3. The direct type backlight module of claim 2, wherein the base is a metal base, and the head is a plastic head.

4. The direct type backlight module of claim 3, wherein the fixing mode of interference fit is used between the head and the base.

5. The direct type backlight module of claim 3, wherein the base is inserted into the head.

6. The direct type backlight module of claim 3, wherein the head is of white plastic, and the surface of the base is applied with the white coating.

7. The direct type backlight module of claim 1, wherein the LED light plate is fixed on the backplane of the direct type backlight module, and the support pin is rigidly fixed on the LED light plate through the LED light plate and the backplane.

8. The direct type backlight module of claim 7, wherein the support pin is fixed on the LED light plate by welding.

9. The direct type backlight module of claim 7, wherein the support pin is fixed on the LED light plate by riveting.

10. The direct type backlight module of claim 1, wherein the LED light plate is fixed on the backplane of the direct type backlight module, wherein, the support pin is rigidly fixed on the backplane, and the LED light plate is correspondingly provided with through holes on the fixing place of the support pin.

11. The direct type backlight module of claim 1, wherein the LED light plate is fixed on the backplane of the direct type backlight module; screws are arranged on the bottom of the support pin; the LED light plate is fixed on the backplane of the direct type backlight module, and the screws simultaneously go through the backplane and the LED light plate, and are locked on the backplane and the LED light plate by nuts.

12. A Liquid Crystal Display (LCD) device comprising a backlight module, the backlight module comprises: a diffuser plate located on the light emergent surface and a backplane opposite to the diffuser plate, and a support pin is arranged between the backplane and the diffuser plate, the support pin is rigidly fixed to the backplane, and the support pin is formed by connecting a base and a head respectively formed.

13. The LCD device of claim 12, wherein the base is fixed on the backplane of the direct type backlight module, and the head contacts the diffuser plate.

14. The LCD device of claim 13, wherein the base is a metal base, and the head is a plastic head.

15. The LCD device of claim 14, wherein the head and the base are interfering fixed together.

16. The LCD device of claim 14, wherein the base is inserted into the head.

17. The LCD device of claim 14, wherein the head is of white plastic, and the surface of the base is applied with the white coating.

18. The LCD device of claim 12, wherein the LED light plate is fixed on the backplane of the direct type backlight module, and the support pin is rigidly fixed on the LED light plate through the LED light plate and the backplane.

19. The LCD device of claim 12, wherein the LED light plate is fixed on the backplane of the direct type backlight module, wherein, the support pin is rigidly fixed on the backplane, and the LED light plate is correspondingly provided with through holes on the fixing place of the support pin.

20. The LCD device of claim 12, wherein the LED light plate is fixed on the backplane of the direct type backlight module; screws are arranged on the bottom of the support pin; the LED light plate is fixed on the backplane of the direct type backlight module, and the screws simultaneously go through the backplane and the LED light plate, and are locked on the backplane and the LED light plate by nuts.

\* \* \* \* \*